United States Patent
Dare et al.

(10) Patent No.: US 10,289,300 B2
(45) Date of Patent: May 14, 2019

(54) FEEDBACK ANIMATION FOR TOUCH-BASED INTERACTIONS

(71) Applicant: Amazon Technologies, Inc., Seattle, WA (US)

(72) Inventors: Nicole Dare, Shoreline, WA (US); Marc Hensley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 15/392,929

(22) Filed: Dec. 28, 2016

(65) Prior Publication Data

US 2018/0181294 A1 Jun. 28, 2018

(51) Int. Cl.

| | | |
|---|---|---|
| G06F 3/048 | (2013.01) | |
| G06F 3/0488 | (2013.01) | |
| G06T 13/80 | (2011.01) | |
| G06F 3/041 | (2006.01) | |
| G06F 3/0481 | (2013.01) | |

(52) U.S. Cl.
CPC ........ G06F 3/04883 (2013.01); G06F 3/0416 (2013.01); G06F 3/04817 (2013.01); G06T 13/80 (2013.01)

(58) Field of Classification Search
CPC .... G06F 3/0488; G06F 3/04883; G06F 3/041; G06F 3/04842; G06F 3/016; G06F 3/04812; G06F 3/0481–3/0489; G06T 13/80; A61B 5/150824
USPC ................................................ 715/700–866
See application file for complete search history.

(56) References Cited

U.S. PATENT DOCUMENTS

| | | | |
|---|---|---|---|
| 8,519,971 B1* | 8/2013 | Mackraz | G06F 3/147 |
| | | | 313/504 |
| 10,168,827 B2* | 1/2019 | Hinckley | G06F 3/0416 |
| 2006/0010400 A1* | 1/2006 | Dehlin | G06F 3/0354 |
| | | | 715/856 |
| 2007/0192692 A1* | 8/2007 | Chen | G06F 3/0488 |
| | | | 715/702 |

(Continued)

FOREIGN PATENT DOCUMENTS

EP   2746926 A2   6/2014

OTHER PUBLICATIONS

International Search Report and Written Opinion in PCT/US2017/067422 dated Mar. 27, 2018.

*Primary Examiner* — Steven B Theriault
(74) *Attorney, Agent, or Firm* — Knobbe, Martens, Olson & Bear, LLP

(57) ABSTRACT

Systems and methods are described for providing animated visual feedback in a manner that increases the likelihood that the feedback will be seen. When a touch-based interaction with a user interface element is detected, a position, orientation, and/or size of the gesturing user's hand and/or digit are determined by assessing factors such as the size and shape of the touched region on the touchscreen, the position of the user interface element relative to the edges of the touchscreen, the orientation of the touchscreen device, and other criteria. An eclipsed region of the touchscreen may be determined, and a starting coordinate for the animated visual feedback may be determined based on the eclipsed region. The animated feedback may be drawn for a determined duration, and may be reversed or erased if the touch-based interaction ceases before the duration is completed.

22 Claims, 9 Drawing Sheets

(56) References Cited

U.S. PATENT DOCUMENTS

| | | | |
|---|---|---|---|
| 2008/0136785 A1* | 6/2008 | Baudisch | G06F 3/0488 345/173 |
| 2009/0237361 A1* | 9/2009 | Mosby | G06F 3/04883 345/173 |
| 2011/0018827 A1* | 1/2011 | Wang | G06F 3/0482 345/173 |
| 2011/0141031 A1* | 6/2011 | McCullough | G06F 3/0481 345/173 |
| 2012/0032979 A1* | 2/2012 | Blow | G06F 1/1626 345/647 |
| 2012/0054671 A1* | 3/2012 | Thompson | G06F 3/038 715/784 |
| 2013/0271375 A1 | 10/2013 | Griffin et al. | |
| 2014/0028701 A1* | 1/2014 | Eriksson | G06F 3/0483 345/619 |
| 2014/0071060 A1 | 3/2014 | Santos-Gomez | |
| 2014/0085202 A1* | 3/2014 | Hamalainen | G06F 3/013 345/158 |
| 2014/0157167 A1* | 6/2014 | Zhu | G06F 3/0486 715/769 |
| 2014/0249763 A1* | 9/2014 | Shimuta | A61B 5/0404 702/19 |
| 2014/0267437 A1* | 9/2014 | Mazzola | G09G 5/373 345/661 |
| 2014/0282269 A1* | 9/2014 | Strutt | G06F 3/04883 715/863 |
| 2015/0084866 A1* | 3/2015 | Thomas | G06F 3/03547 345/158 |
| 2015/0363035 A1* | 12/2015 | Hinckley | G06F 3/0383 345/173 |
| 2016/0109969 A1* | 4/2016 | Keating | G06F 3/03547 345/173 |
| 2016/0139723 A1* | 5/2016 | Brett | G06F 3/0416 345/158 |
| 2016/0378334 A1* | 12/2016 | Liu | G06F 3/0481 715/794 |
| 2018/0088786 A1* | 3/2018 | Abzarian | G06F 3/04845 |
| 2018/0181293 A1 | 6/2018 | Dare et al. | |

* cited by examiner

FEEDBACK ANIMATION FOR TOUCH-BASED INTERACTIONS

BACKGROUND

Generally described, computing devices may provide touch-based user interfaces via a touchscreen or other similar input/output device. A touchscreen may display user interface controls, which may be activated or invoked by making touch gestures. A touch gesture may involve, for example, using a finger, thumb, or other digit to physically touch a target region of the touchscreen that is associated with a user interface control.

Users of computing devices may thus interact with touch-based user interfaces, which may provide visual feedback when the user makes a touch gesture. However, touch-based interactions require that the user's finger or hand cover at least a portion of the touchscreen during the interaction, which may block the user's view of a portion of the touchscreen display during the touch-based interaction.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
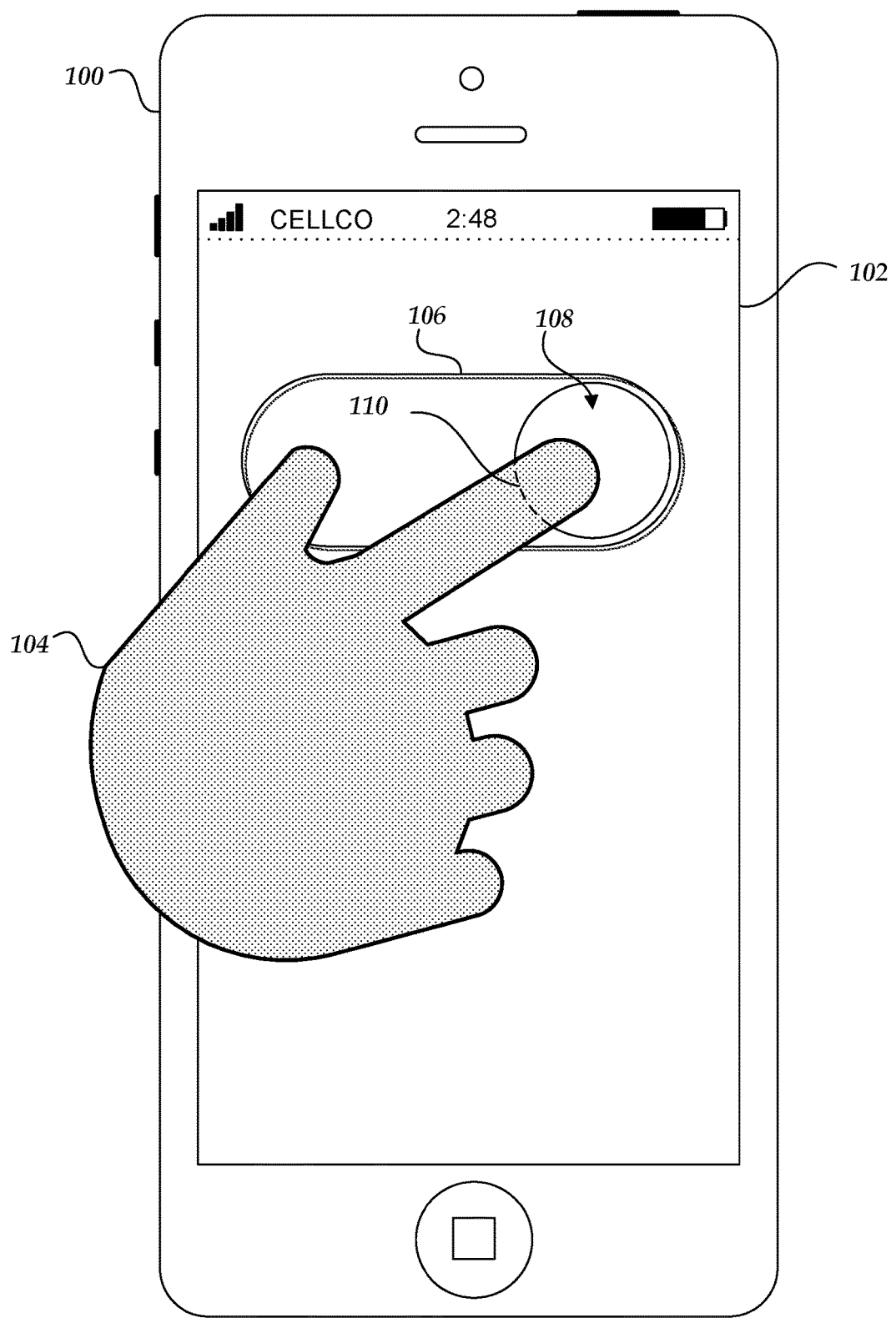
FIG. 1A is an illustrative user interface that depicts the beginning of a touch-based interaction with a user interface control.

Generally described, aspects of the present disclosure relate to touchscreen user interfaces. More specifically, aspects of the present disclosure are directed to systems, methods, and computer-readable media related to providing animated visual feedback in response to a touchscreen gesture, such that the animated feedback is visible to the user despite a portion of the touchscreen being covered by the user's hand and/or digits. Illustratively, a computing device may be equipped with a touchscreen, which may display various user interface elements and controls, and which may receive touch gestures as input. Touch gestures may include, for example, a tap, a double tap, a long press, a tap and hold, a drag, a pinch, and the like. The computing device may capture information regarding the touch gesture, such as a region of the touchscreen that was touched (which may vary over time) and/or a set of touchscreen coordinates (which may similarly vary), an amount of pressure or force exerted against the touchscreen, a duration of the touch gesture, a user interface element associated with the touch gesture, and/or other information.

The computing device may determine that a touch gesture is a long press based on the duration of the gesture, which may be ongoing at the time of the determination. For example, in some embodiments, a touch gesture may be considered a long press as opposed to a tap if the length of time that the touch remains in a given location or region of the touchscreen exceeds a predetermined length of time (such as one second). The computing device may further identify a user interface element associated with the touch gesture. For example, the computing device may identify that the user is making a long press on a user interface ("UI") button or other UI control displayed on the touchscreen. The UI button may illustratively require a long press rather than a tap or other gesture, in order to ensure that the UI button was deliberately pressed. The UI button may, for example, be associated with an action that would be difficult, expensive, or inconvenient to undo if the button were pressed inadvertently. However, the UI button may visually resemble a button that is normally tapped, or that the user would otherwise expect to be immediately responsive to a touch gesture.

The computing device may thus provide animated visual feedback in response to the start of a long press, and may continue to provide animated visual feedback for the duration of the long press that is required to activate the UI button. Illustratively, the animated visual feedback may include gradually drawing an outline around the entire user interface element, an outline around the target region of the user interface element, a fill effect, a distortion (e.g., a 2D or 3D displacement, such as a ripple effect or a change in perspective), a color change, or another form of animated visual feedback. "Target region," as used herein, refers to the region of the touchscreen that, when touched, is considered by the computing device to be an interaction with the displayed user interface element. The target region may illustratively include the entire user interface element, a portion of the user interface element, or may extend beyond the boundaries of the user interface element. For example, a user interface element may include a button and a caption, and the element's target region may include only the portion of the touchscreen that displays the button. As a further example, a user interface element may be contained within a table or a list, and the element's target region may include the entire row of the table or list.

The computing device may attempt to provide immediate visual feedback when the user begins a touch gesture, in order to confirm that the touch gesture has been registered. However, since the user is touching the screen in order to perform the touch gesture, at least a portion of the touchscreen may be hidden from view by the user's digit (e.g., finger or thumb) and/or hand. Accordingly, an animation or other visual feedback displayed by the computing device may not in fact be seen by the user, thus not providing the intended effect of alerting the user that the touch gesture has been registered.

Accordingly, to prevent the visual feedback from being hidden from view by the user's hand, the computing device may determine a region of the touchscreen that is likely eclipsed or blocked from view, and may cause the visual feedback to begin at a coordinate of the touchscreen that is not within the eclipsed portion. For example, the computing device may detect the start of a long press gesture associated with a button displayed on the touchscreen. The computing device may analyze various data associated with the long press gesture, as described in more detail below, to determine a likely position of the user's hand relative to the touchscreen, and to determine a portion of the touchscreen that the user's hand is likely to be covering. Illustratively, the computing device may analyze a size and/or a shape of the touched region, an amount of pressure applied to the touched region (which may, in some embodiments, be a function of the size of the touched region), a position of the user interface element relative to the edges of the touchscreen, an orientation of the touchscreen, and other factors to determine that, for example, the user's right thumb is likely the digit touching the user interface element, and hence that an area of the touchscreen below and to the right of the touched region (e.g., in the shape of a hand with an extended thumb) is likely hidden from view.

As a further example, the computing device may analyze a touched region having a teardrop shape, with the blunt end of the teardrop overlapping a target region of a user interface control and the tail end of the teardrop extending outside the target region. The computing device may determine a centroid, or geometric center, of the teardrop, and may determine that the longest line that can be drawn within the boundaries of the teardrop while passing through the centroid has a slope of 35 degrees. The computing device may thus determine that the digit used to make the touch gesture is extending over the touchscreen at a 35 degree angle, and may determine the position of the user's hand relative to the digit. In some embodiments, the computing device may store information regarding average hand and finger sizes, the sizes and shapes of previous touch regions or reference touch regions, or other information to enable identification of the particular digit (e.g., a thumb, index finger, middle finger, ring finger, or pinky) used to perform the touch gesture, more accurate estimation of the position of the digit, and more accurate estimation of the hand position.

As used herein, "touched region" refers to the portion of a touchscreen with which the user makes actual physical contact during a touch gesture, and/or to information regarding that portion of the touchscreen, such as its boundaries or coordinates. In various embodiments, the touched region may be expressed as the area of contact at a particular moment in time (e.g., when some combination of duration, pressure, capacitance, or other measurements used by the touchscreen to detect a touch exceeds a threshold), as a series of areas captured over time (e.g., the areas that are touched as the user's finger flattens against the touchscreen), or may be captured in real time or near-real time as the touch event proceeds. Additionally, as used herein, "eclipsed region" refers to the portion of the touchscreen that is likely to be hidden from view by the user's hand. While references are made herein to determining the position of the user's hand and/or to determining the eclipsed region, it will be appreciated that these determinations are estimates or predictions of a likely position and/or a likely eclipsed region. It will also be understood that, unless explicitly excluded, references made herein to the user's hand include the digits of the hand.

In some embodiments, the computing device may generate a "heat map" based on the characteristics of a touch gesture over time, and may use the heat map to identify the digit and the relative position of the digit and hand. For example, the computing device may determine that a touch event initially registered as a small, narrow, oval-shaped region, then broadened and became larger as more of the user's digit came into contact with the touchscreen. The computing device may thus determine characteristics such as an angle of the digit, a rotation of the digit (e.g., that the user pressed the touchscreen using the side of a finger), a size of the user's hand, and/or other characteristics.

In further embodiments, the computing device may obtain sensor data from, for example, an accelerometer, a camera, other touch sensors besides the touchscreen (e.g., sensors on the sides or the back of the device that detect how the device is being held), light sensors, vibration sensors, or other input sources to enable more accurate identification and position estimation.

The computing device may then determine an eclipsed region of the touchscreen interface, the user interface control, and/or the target region of the user interface control, based on the estimated size and position of the user's hand and digit. In some embodiments, the computing device may estimate a viewing angle and/or a position of the user's eyes relative to the touchscreen in order to determine the eclipsed region. For example, the computing device may obtain accelerometer data or other data indicating that the computing device is being held at an angle 31 degrees from vertical. The computing device may thus determine that the user is looking down at the touchscreen, and accordingly that the eclipsed region includes portions of the touchscreen that are below the user's hand as well as areas directly covered by the user's hand.

Based on the size and shape of the eclipsed region, the computing device may determine an animation starting coordinate that is likely to be visible to the user. For example, the computing device may determine a coordinate that is furthest away from the eclipsed region while still within the boundaries of the user interface control and/or the target region. As a further example, the computing device may determine a coordinate of the control or the target region that is "most eclipsed" (that is, having the furthest total distance from a non-eclipsed coordinate and/or a center coordinate), and may determine an animation starting coordinate that is geometrically opposite the most eclipsed coordinate. In some embodiments, the computing device may bias its selection toward, for example, the top of the touchscreen, the nearest edge of the touchscreen, the top or nearest edge of the user interface control and/or the target region, or toward other coordinates on the touchscreen. In further embodiments, the bias may be configurable based on user preferences or other data. For example, a user preference or other data may indicate that the user is left-handed. The computing device may therefore determine that coordinates on the right side of the interface are less likely to be hidden from view, and may determine an animation starting coordinate accordingly.

The computing device may then begin delivering animated feedback to the user to indicate that the start of the long press gesture has been received and processed. Illustratively, the computing device may begin drawing the animated feedback at the determined starting coordinate, and may continue drawing animated feedback until either a specified feedback duration is reached or an indication is received that the long press gesture has ended. In some embodiments, the computing device may reverse the direction of the animated feedback, erase the previously drawn animated feedback, or deliver a different animated feedback in response to receiving an indication that the long press gesture ended while the initial feedback animation was still being displayed. In further embodiments, the computing device may display additional feedback, such as a help message, if it detects that a touch gesture (or a series of touch gestures) ended before invoking the user interface control.

The foregoing aspects and many of the attendant advantages will become more readily appreciated as the same become better understood by reference to the following descriptions of illustrative embodiments, when taken in conjunction with the accompanying drawings depicting the illustrative embodiments.

FIG. 1A depicts an illustrative user interface presented by a mobile computing device 100 that implements aspects of the present disclosure. The mobile computing device 100 is described in more detail with reference to FIG. 4 below. In the illustrated embodiment, the mobile computing device 100 includes a touchscreen interface 102, which displays a user interface control 106 having a target region 108. While depicted as an oval and a circle in FIG. 1A, the user interface control 106 and the target region 108 may be of any shape or size, and may be various sizes relative to each other. For example, the user interface control 106 and the target region 108 may be identically shaped, such that a touch anywhere on the user interface control 106 may be interpreted as a touch gesture. As a further example, the target region 108 may be larger than the user interface control 106. Still further, the target region 108 may not correspond to any drawn element on the touchscreen interface 102. For example, the target region 108 may be an area of the touchscreen interface 102 for which the user interface control 106 is the nearest control.

In the illustrated embodiment, a user's hand 104 is initiating a touch gesture by touching the target region 108 of the user interface control 106. Specifically, the left index finger of the user's hand 104 is touching the target region 108. As a result, a portion of the touchscreen interface 102, including an eclipsed portion 110 of the target region 108, is hidden from the user's view. Although FIG. 1 illustrates an eclipsed portion 110 of the target region 108, one skilled in the art will understand that the eclipsed portion 110 may include any part of the touchscreen interface 102 that is covered by the user's hand 104, and that aspects of the present disclosure include determinations of an eclipsed portion 110 of the target region 108, of the user interface control 106, and/or of the touchscreen interface 102.

Figure 1B:
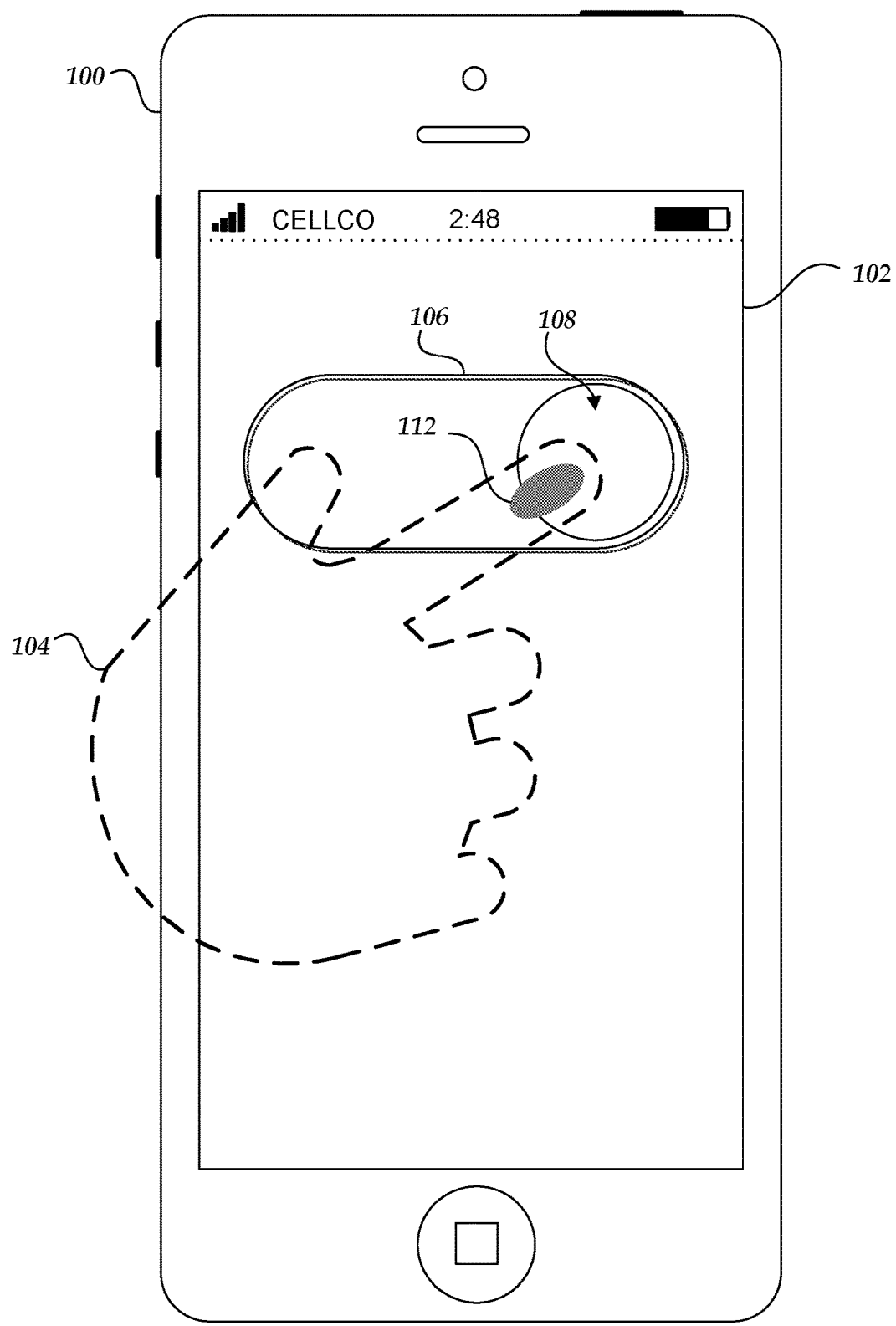
FIG. 1B is an illustrative user interface that depicts a touched region of a touchscreen during an interaction with a user interface control.

FIG. 1B depicts a different perspective on the illustrative user interface of FIG. 1A, in which details that are covered by the user's hand 104 are described. As the user's hand 104 makes physical contact with the touchscreen interface 102, the mobile computing device 100 detects a touched region 112 of the touchscreen interface 102 that is in direct contact with the user's hand 104. While the touched region 112 is visually represented for illustrative purposes in FIG. 1B, it will be appreciated that a visual indication of the touched region would not typically be rendered for actual display by the mobile computing device. The touched region 112 may illustratively be an irregular shape, such as a teardrop, oval, or another shape that naturally occurs as the digit of the user's hand 104 is pressed flat against the touchscreen interface 102. Illustratively, the touchscreen interface 102 may be divided into a grid of pixels or coordinates, and the mobile computing device may identify the touched region 112 as a set of coordinates or as a region or area within the touchscreen interface 102. In some embodiments, the mobile computing device 100 may determine that the touched region 112 overlaps the target region 108 of a user interface control 106, and accordingly may treat the touch as the start of an interaction with the user interface control 106. In some embodiments, the mobile computing device 100 may detect that the touched region 112 changes shape over time. For example, the mobile computing device 100 may detect an initial touched region 112 as the user's hand 104 makes contact with the touchscreen interface 102, and then detect changes to the touched region 112 as a digit of the user's hand 104 is pressed flat against the touchscreen.

Figure 1C:
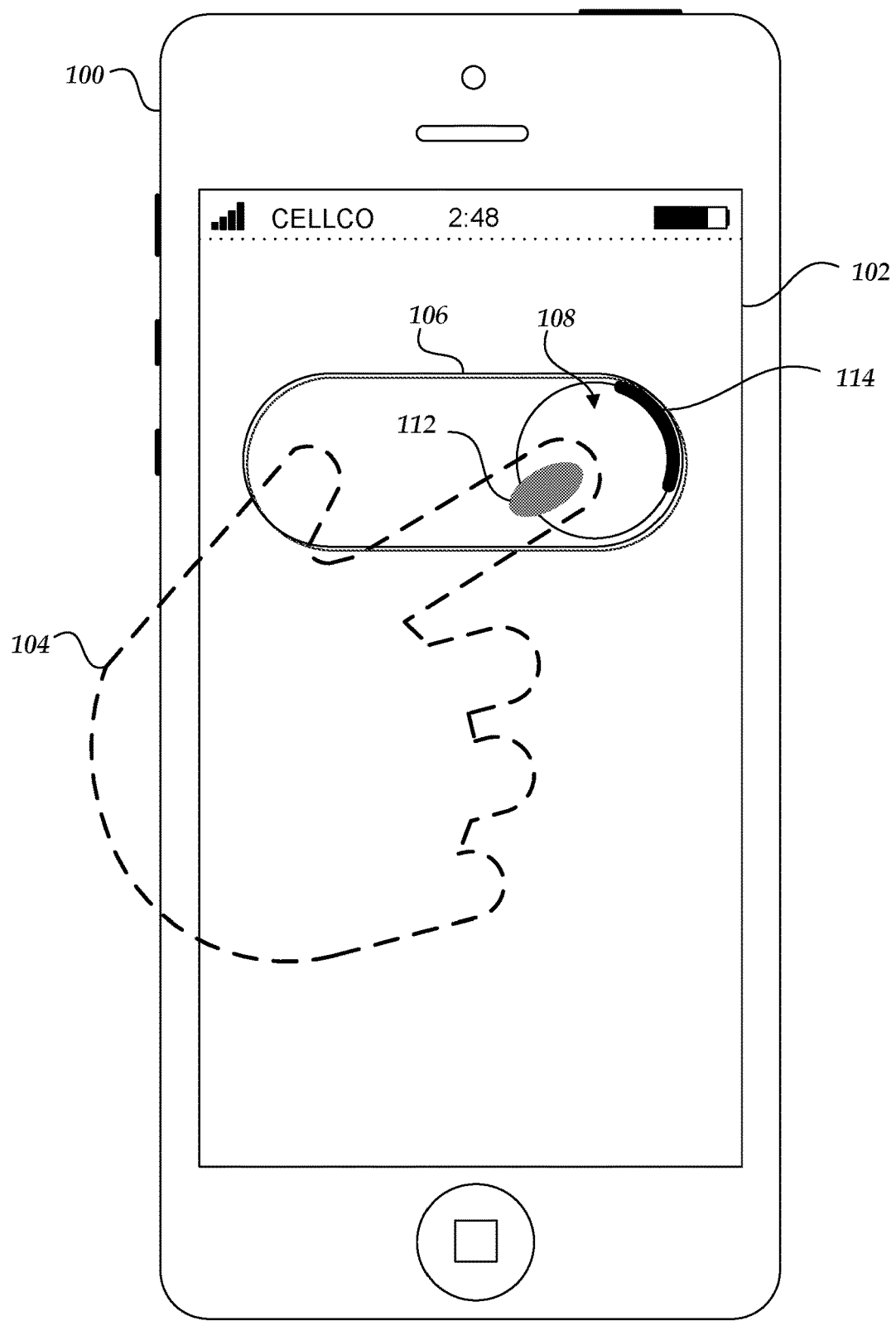
FIG. 1C is an illustrative user interface that depicts the drawing of animated visual feedback in a portion of the user interface that remains visible to the user during the touch-based interaction.

FIG. 1C depicts a view of the illustrative user interface discussed above at a later point in time, after the mobile computing device 100 has begun to provide feedback in response to the touch event whose beginning was depicted in FIGS. 1A and 1B. In FIG. 1C, the mobile computing device 100 has begun to draw a feedback animation 114, which illustratively may have begun drawing at an animation starting point that is opposite the touched region 112 and that is outside the portion of the touchscreen interface 102 that is hidden behind the user's hand 104. In the illustrated embodiment, the feedback animation 114 is an outline gradually drawn around the target region 108, and is animated by drawing both clockwise and counter-clockwise from the animation starting point (such as, for example, by updating the visual display to present an increase in the length of the animated outline 114 at a given refresh rate, such as 30 times per second, during the touch event). In various embodiments, the feedback animation 114 may be an outline, color change, distortion, fill effect, or other animation. As described in detail below, the mobile computing device 100 may determine an animation starting point based on the size, shape, and other characteristics of the touched region 112, the target region 108, the user interface control 106, the touchscreen interface 102, and the mobile computing device 100.

Figure 1D:
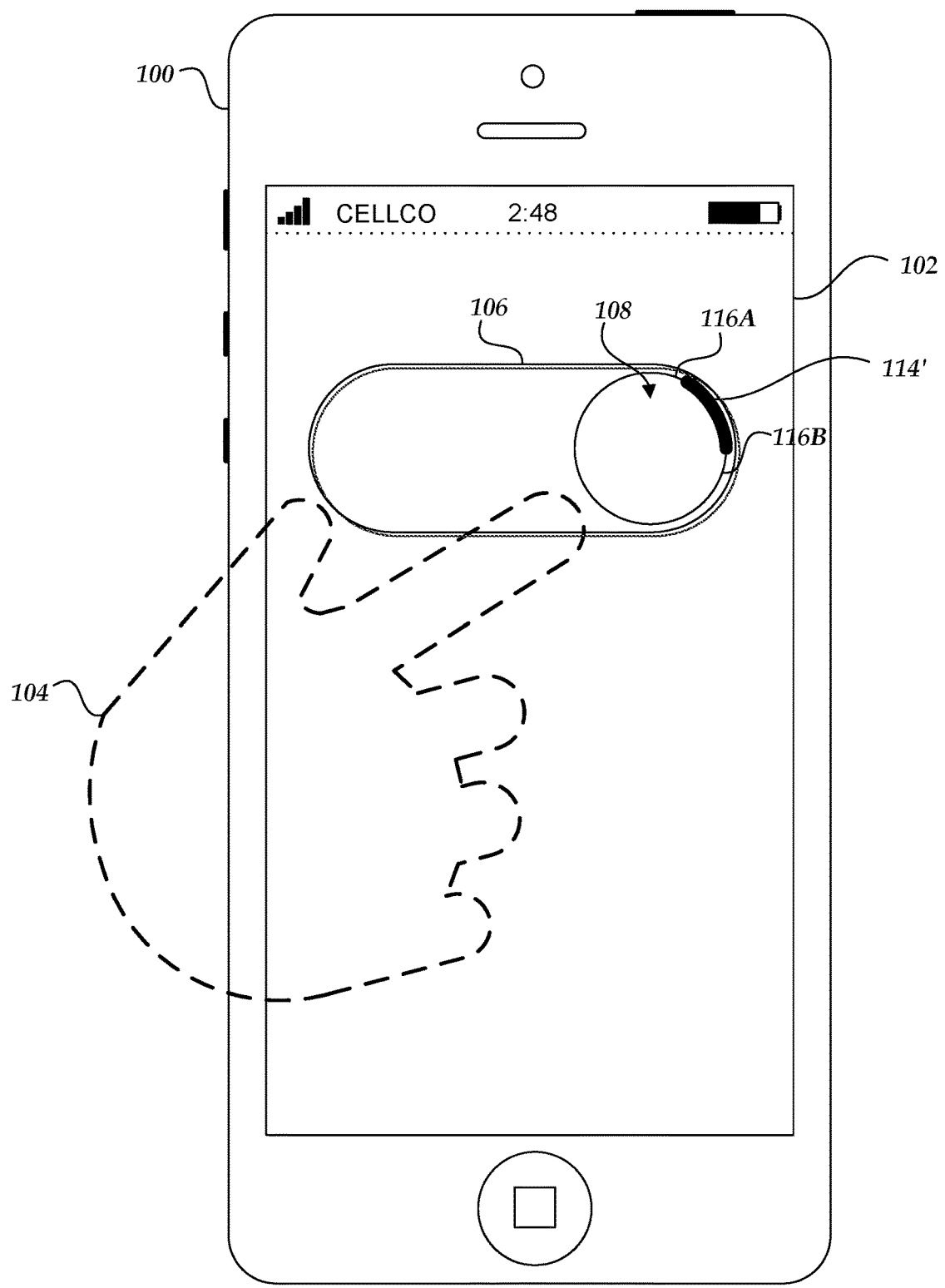
FIG. 1D is an illustrative user interface that depicts the drawing of a second animated visual feedback in response to an interruption of the touch-based interaction.

FIG. 1D depicts a view of the illustrative user interface at a point in time after the user-initiated touch gesture has ended or has been interrupted, such that the user's hand 104 is no longer in physical contact with the touchscreen 102 or is no longer touching a portion of the touchscreen 102 that overlaps the target region 108. In the illustrated embodiment, the mobile computing device 100 has begun to draw a second feedback animation 114', which in some embodiments may be a reversal or erasure of the original feedback animation 114. The mobile computing device 100 may illustratively begin drawing the second feedback animation 114' at the last drawn coordinates 116A-B of the original feedback animation 114, and in various embodiments may continue drawing the second feedback animation 114' until the original feedback animation 114 has been fully erased, until the second feedback animation 114' has completed, or until the mobile computing device 100 receives an indication of the start of a second user-initiated touch gesture, such as a second long press that overlaps the target region 108.

Figure 1E:
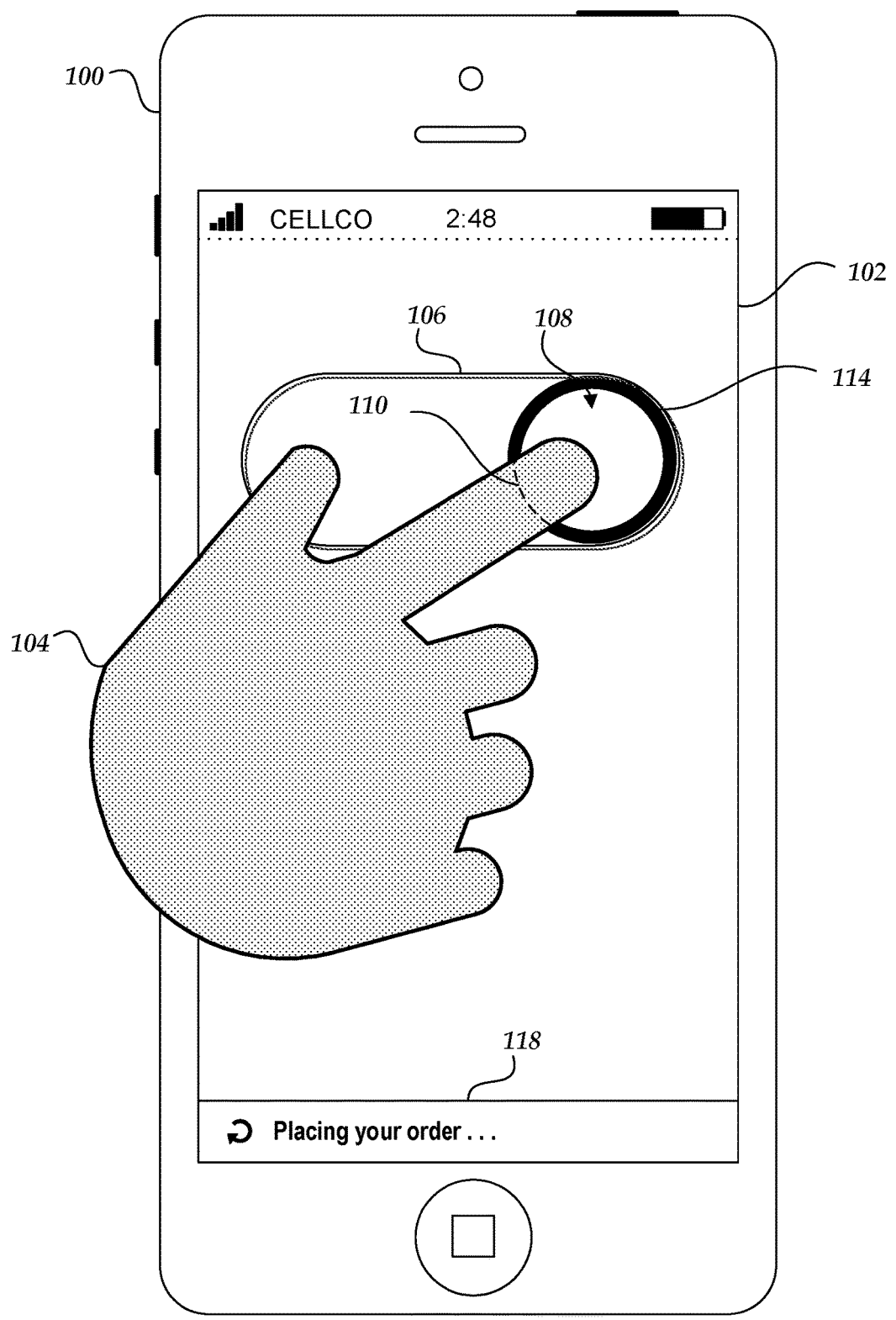
FIG. 1E is an illustrative user interface that depicts completion of the touch-based interaction and completion of the delivery of the animated visual feedback.

FIG. 1E depicts a view of the illustrative user interface of FIGS. 1A-1D at a point in time at which the mobile computing device 100 has completed its drawing of the feedback animation 114. This may occur, for example, in situations where the touch gesture was not interrupted (as in the case of FIG. 1D discussed above), or after the user resumed touching the target region subsequent to an interruption. The feedback animation 114 now fully encircles the target region 108, ending at a coordinate within the eclipsed portion 110 that is not visible to the user due to the placement of the user's hand 104. Illustratively, the mobile computing device 100 may provide other feedback, such as feedback message 118, to indicate that the user has completed the touch event and successfully invoked the user interface control 106. Feedback message 118 may, in various embodiments, be displayed as a status message, a pop-up window, an overlay displayed on top of the user interface control 106, presented as audio feedback, or delivered in other formats. One skilled in the art will understand that FIG. 1E depicts a state that occurs only when the user performs the required touch gesture for as long as is necessary to allow the mobile computing device 100 to complete its drawing of the feedback animation 114. In various embodiments, the mobile computing device 100 may determine a duration for drawing the feedback animation 114, based on criteria such as previous touch events, previously canceled or reversed interactions with the user interface control 106, or other criteria.

Figure 2A:
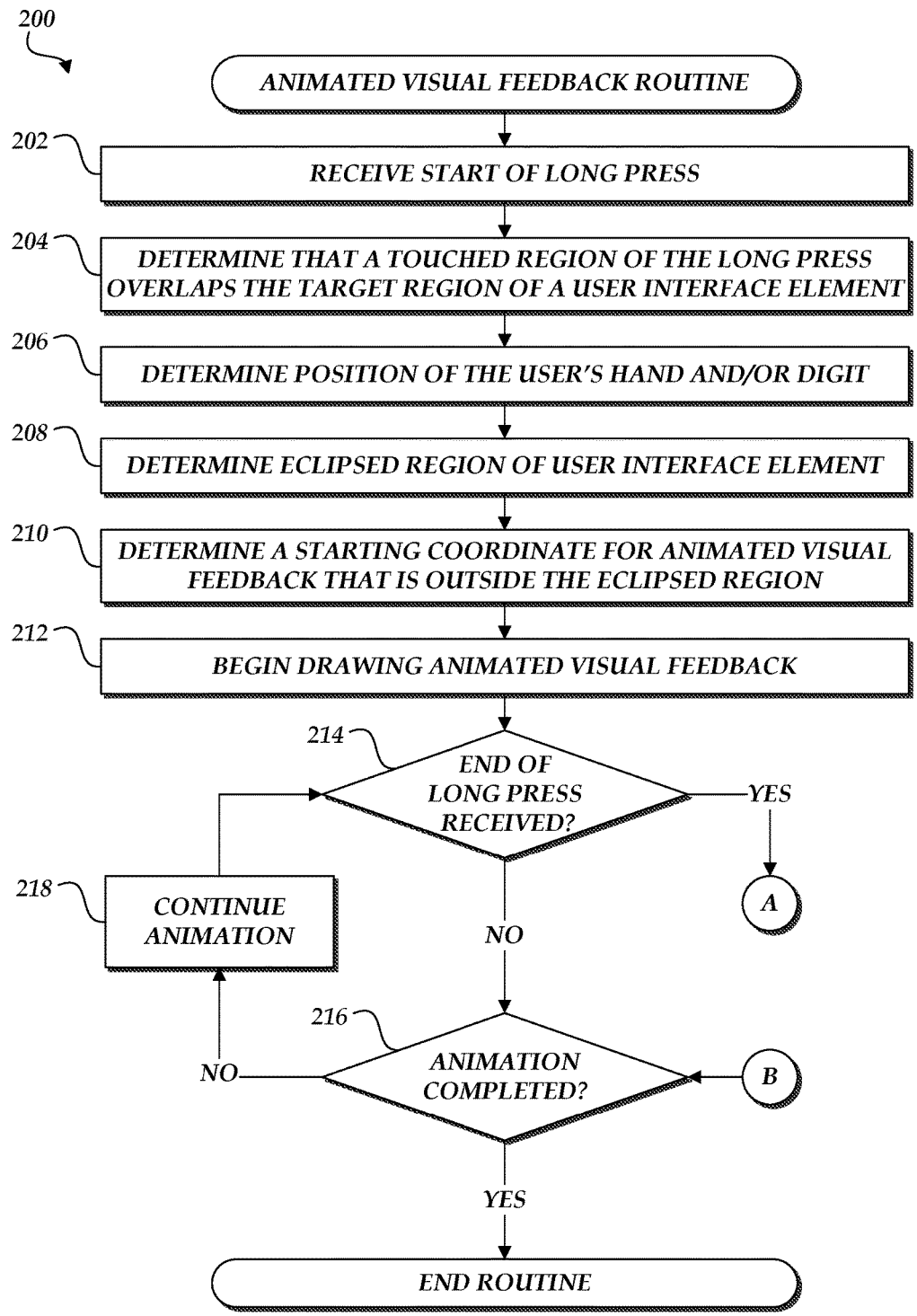
FIGS. 2A and 2B are flow diagrams depicting an illustrative animated visual feedback routine in accordance with aspects of the present disclosure.
Figure 2B:
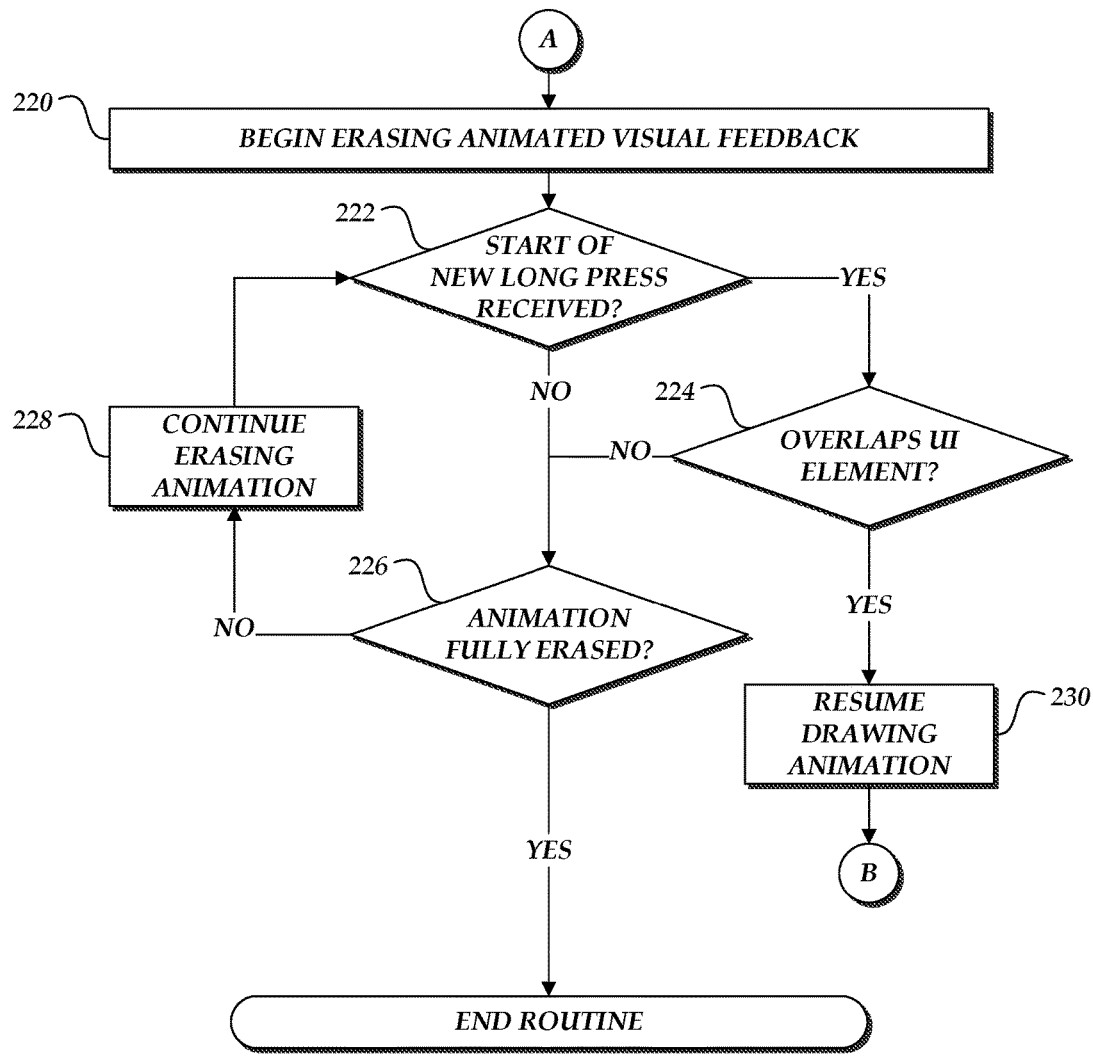

Turning now to FIGS. 2A and 2B, an illustrative routine 200 for drawing animated visual feedback will be described. The routine 200 may be carried out, for example, by the mobile computing device 100 of FIG. 1A. At block 202, an indication of the start of a long press may be received. In some embodiments, the start of a long press may be determined from a touch gesture that continues beyond a threshold duration. In other embodiments, the start of a long press may be received from an operating system or other software of the mobile computing device 100. In further embodiments, the indication of the start of the long press may specify a touched region of a touchscreen, such as the touchscreen interface 102 of FIG. 1A. Alternatively, in some embodiments, a touched region may be determined dynamically based on raw touch data received in association with the touchscreen.

At block 204, an overlap may be determined between the touched region and a target region of a user interface element (e.g., a user interface control). In some embodiments, the overlap may be determined by an operating system or other software, and the indication at block 202 may indicate the target region and/or the user interface element that was overlapped. In other embodiments, the overlap may be determined and/or the user interface element may be identified by comparing the touched region and the target region. For example, the mobile computing device 100 may determine coordinates defining a polygon or other shape that defines the collection of pixels or screen coordinates currently being touched by the user, as well as coordinates defining the displayed target region. The computing device 100 may then determine whether these two areas intersect and whether the intersecting shared region is above a threshold number of pixels or points.

At block 206, a position of the user's hand may be determined. Illustratively, the position of the user's hand may be determined by an eclipsed region determination routine, such as the illustrative routine 300 depicted in FIG. 3 and described in more detail below. In some embodiments, a position of one or more digits may be determined, and the position of the user's hand may be determined based on the position of the digit(s). For example, a determination may be made that the user's index finger is pressed against the touchscreen, based on a size and shape of the touch region. The position of the rest of the user's hand may thus be extrapolated from the position of the index finger.

At block 208, an eclipsed region of the user interface element may be determined. In some embodiments, an eclipsed region of the target region or the touchscreen interface may be determined. The eclipsed region may be determined based on criteria such as an estimated size and position of the user's hand, an estimated position of the user's eyes (e.g., based on the orientation of the mobile computing device), or other criteria. For example, the eclipsed region may include at least any portion of the target region actually being touched (as directly determined via the touchscreen input), as well as portions estimated to be eclipsed or blocked from view based on the estimated position of the user's hand and other factors described above.

At block 210, an animation starting coordinate may be determined. Illustratively, as described above, the starting coordinate may be determined based on a "most eclipsed" coordinate and/or a geometric center of the touched region, the target region, the user interface control, and/or the touchscreen interface. In some embodiments, the starting coordinate may be determined as the coordinate most likely to be visible to the user given the determined eclipsed region and/or the determined positions of the user's hand and digit.

At block 212, the drawing of animated feedback may begin. Illustratively, the drawing may start from the animation starting coordinate. In some embodiments, the animated feedback may be drawn as an outline extending clockwise and counter-clockwise around the target region of a user interface control, as depicted in example FIGS. 1C and 1D, or in other embodiments may be drawn as other types of animated feedback, may progress in a clockwise or counter-clockwise direction around the object, may "fill" the object and progress directly or indirectly toward a coordinate opposite the animation starting coordinate, or in other patterns as described above.

At decision block 214, a determination may be made as to whether an indication of the end of the long press has been received (e.g., whether the user has stopped touching the touchscreen or the touch position has shifted to a position away from the target region). If so, the routine 200 branches to block 220 of FIG. 2B, which will be described below. If the determination at decision block 214 is that an indication of the end of the long press has not been received, then the routine 200 branches to decision block 216, where a determination may be made as to whether the animated visual feedback that was begun at block 212 has completed. If the visual feedback has completed, then the routine 200 ends. In some embodiments, the routine 200 may output that the animation was completed to a computing device (such as the mobile computing device 100 of FIGS. 1A-1D), which may in turn determine that the user interface element overlapped by the touched region has been successfully invoked by the long press. As will be appreciated, a subsequent action triggered by the successfully completed long press may vary widely depending on the purpose of the user interface element. For example, in one embodiment in which the user interface element is presented by an operating system, the completed long press may result in an application being launched, while a user interface element presented by a retail-related application may result in a purchase being made or product being ordered.

If the determination at decision block 216 is that the animated visual feedback has not completed its animation, then the routine 200 branches to block 218, where the animated visual feedback may be continued. The routine 200 then returns to decision block 214, and iterates until the animation is either completed or interrupted (e.g., by receiving an indication of an end of the long press).

Turning now to FIG. 2B, at block 220 erasure of the previously drawn animated feedback may begin. Illustratively, the erasure may begin from the most recently drawn coordinate of the animated feedback. For example, if the animated feedback was a straight line drawn from starting coordinate x=100, y=150 to ending coordinate x=300, y=150, and the animation had proceeded to its halfway point (i.e., the coordinate x=200, y=150), then animating the erasure of the line may begin from coordinate x=200, y=150 and proceed toward the original starting coordinate. Although described as a straight line for purposes of example, one skilled in the art will understand that the animated feedback need not be linear, and indeed may take any shape, curve, or pattern as it proceeds from its starting coordinate to its ending coordinate. For example, the animated feedback may be a ripple effect that expands outward from the starting coordinate in all directions, a fill effect that begins at the starting coordinate and fills a 2D or 3D shape, an outline around an irregular shape, or any number of other animation effects.

In some embodiments, drawing of a second animated visual feedback may instead begin at block 220, and the second feedback may not be an erasure or mirror image of the initial feedback. For example, the initial feedback may be an animation of lighting a fuse, and the second feedback may be an animation of blowing out the fuse. In other embodiments, block 220 and subsequent blocks may be omitted, and the routine 200 may end (with or without removal of any previously drawn feedback) upon receipt of an indication of an end of the long press.

At decision block 222, a determination may be made as to whether an indication of the start of a new long press gesture has been received. If so, the routine 200 branches to decision block 224, where a determination may be made as to whether a touched region associated with the new long press overlaps the target region of the user interface element. If the new long press overlaps the target region (e.g., if the new long press touches the same user interface element as the original long press), then the routine 200 branches to block 230, where drawing of the original animated feedback may be resumed. In various embodiments, drawing may resume from the last erased coordinate, from the original starting coordinate, from the last drawn coordinate of the original drawing, or from another coordinate. The routine 200 then continues at decision block 216 of FIG. 2A.

If the determination at decision block 222 is that an indication of the start of a new long press has not been received, or if the determination at decision block 224 is that the new long press does not overlap the target region of the user interface element, then the routine 200 branches to decision block 226, where a determination may be made as to whether the previously drawn animation has been fully erased. If not, the routine 200 branches to block 228, where erasure of the animation may be continued, and then the routine 200 returns to decision block 222 and iterates until the animation is erased or a new long press of the user interface element is received.

If the determination at block 226 is that the animation has been fully erased, then the routine 200 ends. In some embodiments, the routine 200 may output that a touch interaction with the user interface element was begun but not completed, and a computing device (such as the mobile computing device 100 of FIGS. 1A-1D) may process this output to determine an appropriate duration for a long press of the user interface element, provide a "help message" or other feedback on how to invoke the user interface element, or determine that touch inputs involving the user interface element should be temporarily discarded in order to prevent accidental touches from invoking the user interface element. In some embodiments, routine 200 may include displaying a help message after a specified number of iterations of blocks 214-230, discarding further touch inputs after a specified number of iterations, or determining a duration of the feedback animation based on the iterations. In further embodiments, an animation duration may be determined based on criteria such as cancellation or reversal of an action associated with invoking the user interface element.

Figure 3:
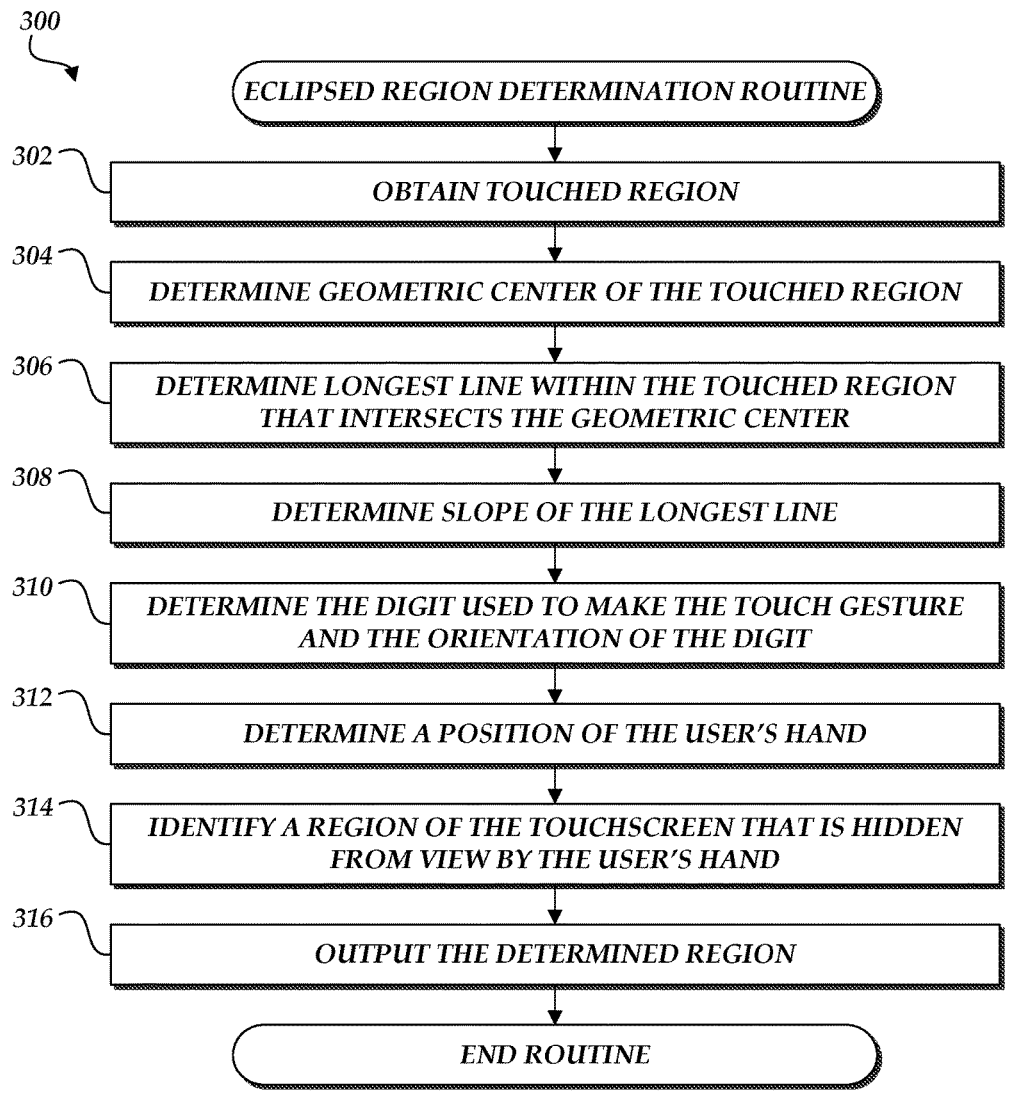
FIG. 3 is a flow diagram depicting an illustrative eclipsed region determination routine in accordance with aspects of the present disclosure.

Turning now to FIG. 3, an example eclipsed region determination routine 300 will be described. The example routine 300 may be carried out, for example, by the mobile computing device 100 of FIGS. 1A-1D, and may be carried out in conjunction with or as part of the example routine 200 of FIGS. 2A-2B. At block 302, a touched region may be obtained. For example, the touched region may be associated with a touch gesture, and may be obtained as part of an operating system event or message regarding the touch gesture.

At block 304, a centroid or geometric center of the touched region may be determined. For example, the centroid may be determined by treating the touched region as a collection of 'n' coordinates $(x_1, y_1), (x_2, y_2), \ldots (x_n, y_n)$, and the centroid may be determined as the coordinate $((x_1+x_2+\ldots+x_n)/n, ((y_1+y_2+\ldots+y_n)/n)$. Other techniques for determining a centroid are known to those skilled in the art and are within the scope of the present disclosure.

At block 306, a longest line that lies within the touched region and that intersects the centroid may be determined, and at block 308 the slope of the longest line may be determined. Thereafter, at block 310, the digit used to make the touch gesture and its spatial orientation may be determined. For example, a relatively long line having a slope of 30 degrees may lead to a determination that the user's index finger was used to make the touch gesture, and that the index finger is oriented at a 30 degree angle to the touchscreen. At block 312, a position of the user's hand may be determined based on the position of the digit used in the touch gesture.

One skilled in the art will understand that the interactions carried out at blocks 304-310 are provided for purposes of example, and that various approaches to characterizing the size and/or shape of the touched region are within the scope of the present disclosure. For example, a largest rectangle, oval, or other shape that may be drawn within the boundaries of the touched region may be determined. As a further example, the touched region may be compared to reference models, which may be generated based on simulated or actual touch interactions in which the position of the hand and/or the digits of the hand are known. Still further, the position of the user's hand and/or digits may be modeled in two or three dimensions using factors such as the spatial orientation of the touchscreen (e.g., whether the touchscreen is in a portrait mode or a landscape mode, whether it is being held vertically or at an angle, and so forth), the amount of pressure applied and/or the size of the touched region, the geometry of the touched region, or other factors. For example, the touched region may be relatively small and round, and the routine 300 may thus determine that the user is "poking" the touchscreen with a finger extended at a nearly perpendicular angle. Alternatively, the touched region may be relatively long and narrow, and the routine 300 may determine that the user is making contact with the side of the thumb. Even further, in some embodiments, the touched region may be modeled as a region that changes over time, and the routine 300 may incorporate reference models that change over time to determine the specific digit used to make the gesture, the angle and rotation of the digit, and so forth.

In some embodiments, the routine 300 may determine whether the user's left hand or right hand is being used to make the touch gesture, based on factors such as the relative position of the user interface element on the touchscreen. For example, the routine 300 may determine, based on the size and angle of the touched region and the relative position of the user interface element (or its target region), that the user is extending a right thumb across the touchscreen to make the touch gesture. In further embodiments, the routine 300 may determine a digit or a hand based on the relative size of the touchscreen, user preference data (e.g., a user preference for left-handed operation), biometric information (e.g., a user's height, weight, and other factors may be used to determine an expected touch region size, or to determine a likelihood that the user is making a one-handed gesture), or data from a computing device's camera, accelerometer, or other sensors that may provide information about the hand or digit used to make the touch gesture.

At block 314, a region of the touchscreen that is hidden from view by the user's hand (including the digit(s) used to make the touch gesture) may be identified. In some embodiments, the relative positions of the touchscreen, the user's hand, and the user's eyes may be determined, and the portions of the touchscreen that are hidden from view by the user's hand may be determined according to a three-dimensional model, which may take into account factors such as a viewing angle of the touchscreen. In other embodiments, the relatively short distance between the touchscreen and the user's hand may be treated as the dominant factor in determining the size and shape of the eclipsed region.

At block 316, the eclipsed region that was determined may be output. In some embodiments, the entire routine 300 may be a subroutine that is called by another routine, such as the animated visual feedback routine 200 of FIGS. 2A and 2B, and the output of the routine 300 may be used by the routine 200. For example, routine 300 may be carried out as part of blocks 206 and 208 of routine 200, and the eclipsed region may be utilized as described above to determine an animation starting coordinate.

Figure 4:
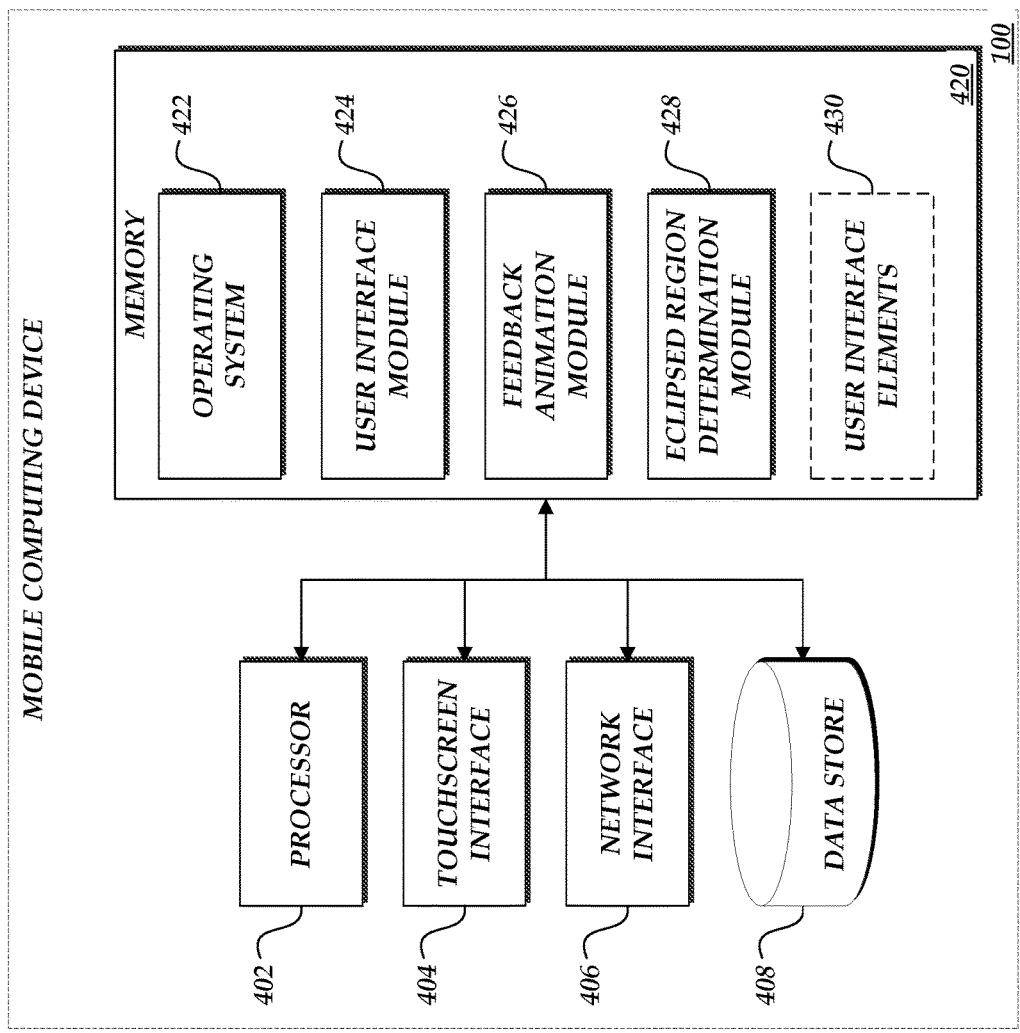
FIG. 4 is a general architecture of an example mobile computing device that is configured to implement aspects of the present disclosure.

FIG. 4 further depicts a general architecture of the mobile computing device 100, which includes an arrangement of computer hardware and software components that may be used to implement aspects of the present disclosure. The mobile computing device 100 may include many more (or fewer) elements than those shown in FIG. 4. It is not necessary, however, that all of these elements be shown in order to provide an enabling disclosure.

As illustrated, the mobile computing device 100 includes a processor 402, a touchscreen interface 404, a network interface 406, and a data store 408, all of which may communicate with one another by way of a communication bus. The network interface 406 may provide connectivity to one or more networks (not depicted in FIG. 4) or computing systems and, as a result, may enable the mobile computing device 100 to receive and send information and instructions from and to other computing systems or services.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the mobile computing device 100. The memory 420 may further store specific computer-executable instructions and other information (which may be referred to herein as "modules") for implementing aspects of the present disclosure. For example, the memory 420 may include a user interface module 424, which may perform various operations with regard to the touchscreen interface 404. For example, the user interface module 424 may identify particular touch gestures, such as a long press, and may identify which user interface control was the target of the touch gesture.

In some embodiments, the memory 420 may include a feedback animation module 426 and an eclipsed region determination module 428, which may be executed by the processor 402 to perform various operations, such as those operations described with reference to FIGS. 1A-1D, 2A-2B, and 3.

While the operating system 422, the user interface module 424, the feedback animation module 426, and the eclipsed region determination module 428 are illustrated as distinct modules in the memory 420, in some embodiments, the user interface module 424, the feedback animation module 426, and the eclipsed region determination module 428 may be incorporated as modules in the operating system 422 or another application or module, and as such, separate modules may not be required to implement some embodiments. In some embodiments, the user interface module 424, the feedback animation module 426, and the eclipsed region determination module 428 may be implemented as parts of a single application.

It will be recognized that many of the devices described above are optional and that embodiments of the mobile computing device 100 may or may not combine devices. Furthermore, devices need not be distinct or discrete. Devices may also be reorganized. For example, the mobile computing device 100 may be represented in a single physical device or, alternatively, may be split into multiple physical devices. Additionally, while referred to herein as a "mobile" computing device 100, aspects of the present disclosure are not limited to any particular type of computing device, and may include devices such as desktop computing devices, laptops, tablets, wearables, gaming consoles, media players, and any other device capable of implementing aspects of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A computer-implemented method comprising:
   causing display, on a touchscreen, of a user interface element, wherein the user interface element is associated with a target region of the touchscreen;
   receiving an indication of a start of a long press in association with the touchscreen, the indication comprising at least a touched region of the touchscreen, wherein the long press comprises physical contact with the touched region that exceeds a threshold duration;
   determining that the touched region overlaps the target region of the user interface element;
   determining, based at least in part on a shape of the touched region, a spatial orientation at least one of a digit or hand relative to the touchscreen, wherein the spatial orientation is determined for at least a part of the digit or hand that is not in physical contact with the touchscreen;
   determining, based at least in part on the spatial orientation of the digit or hand, an eclipsed sub-region of the target region, the eclipsed sub-region representing a portion of the user interface element that is estimated to be hidden from view by the digit or hand;
   determining, based at least in part on the eclipsed sub-region, an animation starting coordinate that is outside the eclipsed sub-region; and
   causing a display of animated feedback during the long press, wherein the animated feedback starts at the animation starting coordinate.

2. The computer-implemented method of claim 1, wherein the animated feedback comprises at least one of an outline, a distortion, a fill effect, or a color change.

3. The computer-implemented method of claim 1, wherein the animated feedback is drawn in at least one of a clockwise direction around the user interface element or a counterclockwise direction around the user interface element.

4. The computer-implemented method of claim 1, wherein determining the spatial orientation of at least one of the digit or hand comprises:
   determining a centroid of the touched region;
   determining a longest line within the touched region that intersects the centroid; and
   identifying a slope of the longest line as the spatial orientation of the digit or hand.

5. A system comprising:
   a memory;
   a touchscreen;
   a processor in communication with the memory and the touchscreen; and
   computer-executable instructions stored in the memory that, when executed by the processor, configure the processor to:
     receive, from the touchscreen, a touch input, the touch input specifying at least a touched region of the touchscreen;
     determine that the touched region overlaps a target region of a user interface element displayed on the touchscreen;
     determine, based at least in part on a shape of the touched region, an estimated spatial orientation of at least one of a digit or hand of a user relative to the touchscreen, wherein the estimated spatial orientation is determined for at least a part of the digit or hand that is not in physical contact with the touchscreen;

determine, based at least in part on the spatial orientation of the digit or hand of the user, an eclipsed portion of the user interface element, the eclipsed portion of the user interface element corresponding to a portion of the user interface element that is estimated to be hidden from view by the digit or hand;

determine, based at least in part on the eclipsed portion of the user interface element, a starting coordinate for a display of animated feedback; and cause a display of the animated feedback to start at the starting coordinate.

6. The system of claim 5, wherein the starting coordinate is determined based at least in part on a distance from the eclipsed portion of the user interface element.

7. The system of claim 6, wherein the distance is a furthest distance from the eclipsed portion within the target region.

8. The system of claim 5, wherein the spatial orientation of the digit is determined based at least in part on a position of the target region relative to an edge of the touchscreen.

9. The system of claim 5, wherein the processor is further configured to determine a digit identification based at least in part on a size of the touched region.

10. The system of claim 9, wherein the digit identification is a thumb, an index finger, a middle finger, a ring finger, or a pinky finger.

11. The system of claim 9, wherein the eclipsed portion of the user interface element is determined based at least in part on the digit identification.

12. The system of claim 5, wherein the processor is further configured to determine a hand identification based at least in part on the spatial orientation of the digit or hand.

13. The system of claim 12, wherein the hand identification is a left hand or a right hand.

14. The system of claim 12, wherein the eclipsed portion of the user interface element is determined based at least in part on the hand identification.

15. A non-transient computer-readable medium containing computer-executable instructions that, when executed by a processor, configure the processor to at least:

receive an indication of a start of a touch gesture, the indication specifying at least (a) a touched set of coordinates on a touchscreen interface and (b) a user interface element associated with the touched set of coordinates;

determine, based at least in part on a shape of the touched set of coordinates, an eclipsed set of coordinates of the user interface element, the eclipsed set of coordinates defining a portion of the user interface element blocked from view as a result of the touch gesture, the eclipsed set of coordinates including one or more coordinates blocked from view by at least a part of a digit or hand that is not in physical contact with the touchscreen interface;

determine, based at least in part on the eclipsed set of coordinates of the user interface element, a starting coordinate for a feedback animation; and cause display of the feedback animation to start at the starting coordinate.

16. The non-transient computer-readable medium of claim 15, wherein the touched set of coordinates intersects a target set of coordinates of the user interface element.

17. The non-transient computer-readable medium of claim 15, wherein the eclipsed set of coordinates is determined based at least in part on a spatial orientation of the touched set of coordinates.

18. The non-transient computer-readable medium of claim 15, wherein the processor is further configured to determine, based at least in part on the touched set of coordinates, a duration of the feedback animation.

19. The non-transient computer-readable medium of claim 15, wherein a duration of the feedback animation is determined based at least in part on a size of the touched set of coordinates.

20. The non-transient computer-readable medium of claim 15, wherein a duration of the feedback animation is determined based at least in part on one or more previous touch gestures associated with the user interface element.

21. The non-transient computer-readable medium of claim 15, wherein the processor is further configured to:

identify a set of visible coordinates of the user interface element;

identify a most eclipsed coordinate, the most eclipsed coordinate corresponding to a coordinate in the eclipsed set of coordinates that is furthest from a visible coordinate;

wherein the starting coordinate for the feedback animation is determined based at least in part on the most eclipsed coordinate.

22. The non-transient computer-readable medium of claim 15, wherein the processor is further configured to:

cause the display of the feedback animation to continue until completion; and cause display of a notification on the touchscreen interface, the notification indicating completion of an interaction with the user interface element.

* * * * *